March 7, 1933.  R. C. SCHEMMEL  1,900,769
MOLDING
Filed April 30, 1930
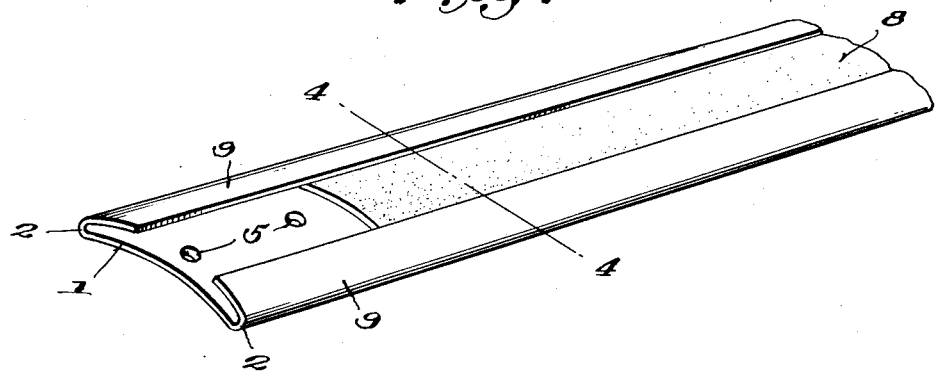
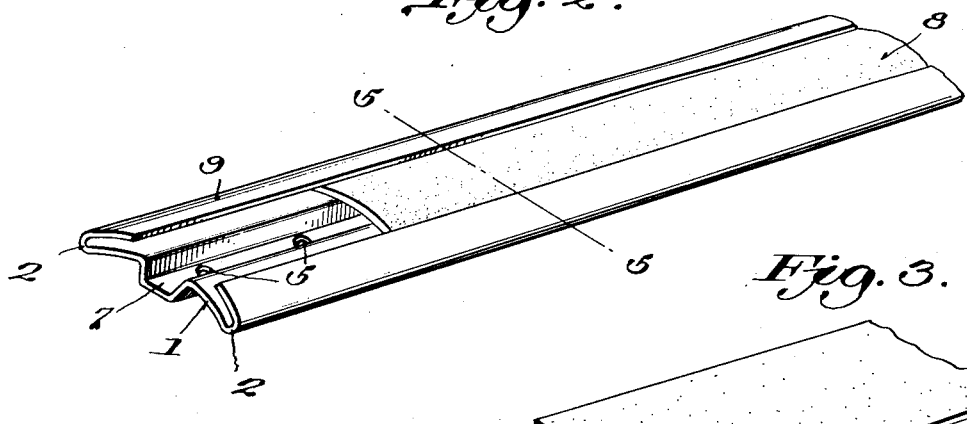
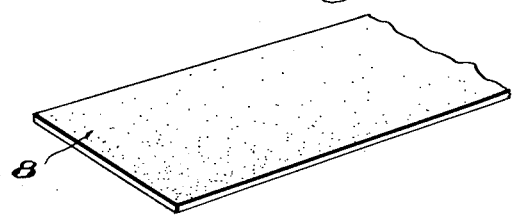
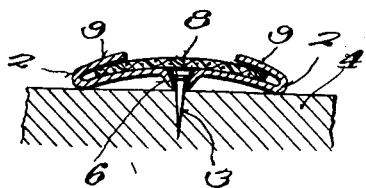  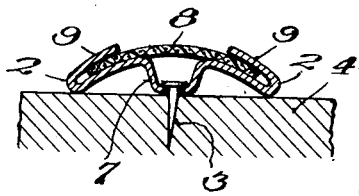
Inventor
Robert C. Schemmel
By Dyre & Kirchner
Attorneys Patented Mar. 7, 1933

1,900,769

UNITED STATES PATENT OFFICE

ROBERT C. SCHEMMEL, OF UNION CITY, INDIANA

MOLDING

Application filed April 30, 1930. Serial No. 448,586.

My invention relates to molding strips or finishing trims especially adapted to use on automobile bodies to conceal the raw marginal edges of the roof covering fabric.

More especially, my invention constitutes an improvement in the type of molding strip which forms the subject of United States Letters Patent No. 1,448,986, issued March 20, 1923 to Joseph B. Zimmers, the particular objects of the present invention being to provide a molding strip which shall be superior to the Zimmers molding in appearance, facility of application, and principally in economy of manufacture.

My present invention attains these and other desirable objects by eliminating from the molding the costly solid rubber half-round which, with its fabric covering, forms the channel filler or insert of the Zimmers molding, and by substituting therefor an exceedingly inexpensive strip of fabric or the like, and by further substituting for the Zimmers channel or base member another channel of a different form which, when associated with the filler strip constitutes a complete and exceedingly inexpensive molding which is in appearance and efficiency equal or superior to any molding of the prior art of which I am aware.

In the accompanying drawing which forms part of this application for Letters Patent, and in which the same reference numeral indicates the same part in the several views, Figure 1 is a perspective view of one form of molding made according to the principles of my present invention, with the filler strip partly removed to show to better advantage the structure of the base channel;

Figure 2 is a similar view of a modified type of molding;

Figure 3 is a perspective view of the filler strip;

Figure 4 is a cross section taken along the line 4—4 of Figure 1; and

Figure 5 is a cross section taken along the line 5—5 of Figure 2.

Referring now to the drawing, the reference numeral 1 designates generally a base channel which is conveniently formed of metal or similar relatively firm and stiff material. In order to provide the finishing strip with the convex upper surface or "contour" which forms an important factor in the appearance of the molding, the base 1 is arched to any desired extent, that is to say, the material of the base is extended upwardly between its longitudinal edges 2.

In order to provide a firm support for the arched portion and prevent collapse thereof under the stress of blows of a hammer or the like used to drive nails 3 through the channel to secure the same to a support 4, a portion of the channel is depressed along its center line to the plane of the edges 2. The center line of the channel is also provided with a series of perforations 5, each adapted to receive a tack or nail 3.

The depression along the center line of the channel may take any convenient form. In Figs. 1 and 4 one type of channel is shown in which the depressed portion consists of downwardly struck portions 6 of the metal of the channel 1 surrounding each of the perforations 5.

Figs. 2 and 5 illustrate another form of the invention in which the depressed portion consists of a downwardly extended central channel 7 which contains perforations 5, the metal at the margins of the perforations in this modification being of course flush with the surface of the central channel 7.

In the case of either modification it is to be noted that the under surface of the central depressed portion of the channel 1 lies below the level of the arched portion of the channel 1, and preferably in substantially the same plane with the edges 2, so that when the channel is securely fixed to a plane support 4 by means of nails or tacks 3, it will be maintained against the support along three lines, i. e., the two longitudinal edges 2 and the line of central perforations 5.

The edges of the metal strip which forms the channel 1 are disposed in any convenient manner to receive a filler strip 8 which may consist merely of a plain, flat single ply of fabric, leather or similar material, or even of metal if desired. The filler retaining portion of the channel 1 may consist of the edges of the metal which forms the channel, turned upwardly and inwardly a short distance from the edges 2 of the channel and spaced slightly away from the outer margins of the arched upper surface thereof. The width of the filler strip 8 is conveniently slightly greater than the distance between the opposite edges of the inturned flanges 9 and slightly less than the distance between the edges 2 of the channel, so that the filler strip is conveniently held against the arched portion of the channel by the flanges 9.

It is believed that the mode of applying the molding which has just been described will be understood to comprise the following steps:

The channel is first secured in place to any support 4 by driving nails or tacks 3 into the support through as many of the perforations 5 as may seem necessary. A filler strip 8 of sufficient length is then fitted into the channel by tucking its longitudinal edges under the flanges 9 in an obvious manner.

It will be apparent that the association of the novel parts which have been described results in providing at a minimum cost a molding strip having the neat, convex appearance of the moldings of the prior art which employ expensive half round filler cores of rubber and the like.

It is to be understood that I have shown and described herein my present invention in two preferred forms of embodiment merely by way of exemplification. Other and further modifications will readily suggest themselves to persons skilled in the art, and all such modifications to the extent that they embody the principles of the invention as pointed out in the appended claims, are to be considered within the scope and purview thereof.

Having thus described my present invention what I now claim and desire to secure by Letters Patent is:

1. A molding strip including a base member having a depressed center portion and longitudinal edges all lying in a single plane, the upper surface of the base member between the depressed center portion and the longitudinal edges being arched above the single plane thereof, marginal portions of the base member being turned inwardly from the longitudinal edges and lying substantially parallel to and spaced slightly above the upper surface of the base portion, a series of tack-receiving perforations provided in the depressed center portion, and a flexible fabric covering strip received under the inwardly turned marginal portions, covering the depressed center portion, and engaging and receiving support from the portions of the arched upper surface of the base member adjacent the depressed center portion.

2. A molding strip as claimed in claim 1, in which the depressed center portion is a continuous channel.

3. A molding strip as claimed in claim 1, in which the depressed center portion is a downwardly directed flange surrounding each of the tack-receiving perforations.

In testimony whereof I affix my signature.

ROBERT C. SCHEMMEL.